US006249605B1

(12) United States Patent
Mao et al.

(10) Patent No.: US 6,249,605 B1
(45) Date of Patent: Jun. 19, 2001

(54) KEY CHARACTER EXTRACTION AND LEXICON REDUCTION FOR CURSIVE TEXT RECOGNITION

(75) Inventors: Jianchang Mao, San Jose, CA (US); Matthias Zimmerman, Huenenberg (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/152,587

(22) Filed: Sep. 14, 1998

(51) Int. Cl.[7] .............................. G06K 9/18; G06K 9/00; G06K 9/34

(52) U.S. Cl. ...................... 382/186; 382/178; 382/179; 382/187

(58) Field of Search .................................. 382/155, 156, 382/159, 160, 161, 177, 178, 179, 186, 187, 188, 189, 119, 123; 706/25

(56) References Cited

U.S. PATENT DOCUMENTS

| | | | |
|---|---|---|---|
| 5,854,855 | * 12/1998 | Errico et al. | 382/187 |
| 5,903,884 | * 5/1999 | Lyon et al. | 706/25 |
| 5,999,649 | * 12/1999 | Nicholson et al. | 382/190 |

OTHER PUBLICATIONS

Benedetti et al, "Confidence Computation Improvement in an Optical Field Reading System"; IEEE Paper ISBN: 0–8186–7898–4, vol. 2, pp. 836–841, Aug. 1997.*

Fairhurst et al, "Genearlized Approach to the Recognition of Structurally Similar Handwritten Characters using Multiple Expert Classifiers"; IEEE Paper ISSN: 1350–245X, vol. 144, Issue 1, pp. 15–22, Feb. 1997.*

Bozinovic et al., "Off–line Cursive Word Recognition," *IEEE Trans. PAM1*, 11:68–83, Jan. 1989.

Chen et al., "Variable Duration Hidden Markov Model and Morphological Segmentation for Handwritten Word Recognition," *IEEE Trans. On Image Processing*, 4 (12): 1675–1688, Dec. 1995.

(List continued on next page.)

*Primary Examiner*—Amelia Au
*Assistant Examiner*—Mehrdad Dastouri
(74) *Attorney, Agent, or Firm*—Gray Cary Ware & Freidenrich LLP; McGinn & Gibb, PLLC

(57) ABSTRACT

A method, apparatus, and article of manufacturing employing lexicon reduction using key characters and a neural network, for recognizing a line of cursive text. Unambiguous parts of a cursive image, referred to as "key characters," are identified. If the level of confidence that a segment of a line of cursive text is a particular character is higher than a threshold, and is also sufficiently higher than the level of confidence of neighboring segments, then the character is designated as a key character candidate. Key character candidates are then screened using geometric information. The key character candidates that pass the screening are designated key characters. Two-stages of lexicon reduction are employed. The first stage of lexicon reduction uses a neural network to estimate a lower bound and an upper bound of the number of characters in a line of cursive text. Lexicon entries having a total number of characters outside of the bounds are eliminated. For the second stage of lexicon reduction, the lexicon is further reduced by comparing character strings using the key characters, with lexicon entries. For each of the key characters in the character strings, it is determined whether there is a mismatch between the key character and characters in a corresponding search range in the lexicon entry. If the number of mismatches for all of the key characters in a search string is greater than (1+(the number of key characters in the search string/4)), then the lexicon entry is eliminated. Accordingly, the invention advantageously accomplishes lexicon reduction, thereby decreasing the time required to recognize a line of cursive text, without reducing accuracy.

21 Claims, 10 Drawing Sheets

FIGURE 9A

OTHER PUBLICATIONS

Kimura et al., "Lexicon Directed Segmentation–Recognition Procedure for Unconstrained Handwritten Words," *Proceedings of Intl. Workshop on Frontier in Handwriting Recognition*, pp. 122–131, Buffalo, NY, 1993.

Kaufmann et al., "Lexicon Reduction in a HMM–Framework Based on Quantized–Feature Vectors," *Proc. of Intl. Conf. on Document Analysis and Recognition*, pp. 1097–1101, Ulm, Germany, Aug. 1997.

Gader et al., "Neural and Fuzzy Methods in Handwriting Recognition," *Computer*, pp. 79–85, Feb. 1997.

Madhvanath et al., "Holistic Lexicon Reduction," *Proceedings of Intl. Workshop on Frontier in Handwriting Recognition*, pp. 71–81, Buffalo, NY, 1993.

Madhvanath et al., "Effective Reduction of Large Lexicons for Recognition of Offline Cursive Script," *Proceedings of Intl. Workshop on Frontier in Handwriting Recognition*, pp. 189–194, Essex, England 1996.

Mao et al., "A System for Cursive Handwritten Address Recognition," *Intl. Conf. on Pattern Recognition*, Brisbane, Australia, Aug. 1998.

Mohamed et al., "Handwritten Word Recognition Using Segmentation–Free Hidden Markov Modeling and Segmentation–Based Dynamic Programming Techniques," *IEEE Trans. Pattern Anal. Machine Intell.*, 18 (5):548–554, May 1996.

Srihari, S., "Recognition of Handwritten and Machine-Printed Text for Postal Address Interpretation," *Pattern Recognition Letters*, 14:291–302, Apr. 1993.

Cherietet al., "Extraction of Key Letters for Cursive Script Recognition," *Pattern Recognition Letters*, 14:1009–1017, Dec. 1993.

\* cited by examiner

KEY CHARACTER EXTRACTION AND LEXICON REDUCTION FOR CURSIVE TEXT RECOGNITION

BACKGROUND OF THE INVENTION

1. Field of the Invention

The present invention relates to recognizing a line of cursive text. More particularly, the invention concerns a method, apparatus, and article of manufacture employing lexicon reduction using key characters for recognizing a line of cursive text.

2. Description of the Related Art

Recognition of cursive text is a challenging problem encountered in many applications, such as postal mail sorting, bank check recognition, and automatic data entry from business forms. Typically the cursive text is handwritten words and numbers. Herein the words "cursive text" refer to cursive words, letters, numbers, and/or other symbols, which are handwritten and/or machine printed. In practice, cursive text is usually handwritten, and is only infrequently machine printed. In order to recognize cursive text, commonly an electronic representation of an image, typically a bit map, is produced. An image containing a cursive word or a line of cursive text may be referred to as a word image or as a line image. After being processed by a text recognition system, the image may be identified as a text line.

A prevalent technique for cursive word recognition is based on over-segmentation followed by dynamic programming. With this approach, a set of split points 105 on word strokes is chosen based on heuristics to divide a word (illustrated in FIG. 1A) into a sequence of graphemes 110 (primitive structures of characters), as shown in FIG. 1B. With this technique, characters, which can be letters, numbers, and/or any other symbols, may consist of one, two, or three graphemes. As can be seen in FIG. 2, graphemes 110 are typically identified by boxes drawn around portions of the cursive text.

FIG. 1B includes a segmentation graph 115, which is used for identifying the characters. Each internal node in the graph represents a split point in the word. The left-most node and right-most node indicate the word boundary. The word recognition problem can be viewed as a problem of finding the best path in a segmentation graph. To accomplish this, typically a character classifier is used to assign a cost to each edge 120 in the segmentation graph. Each edge represents the segment between the two split points connected by the edge. After a cost is assigned to each edge, the dynamic programming technique is used for finding the best, and hopefully the desired, path from the left-most node to the right-most node. A sequence of characters, shown in FIG. 2, can then be obtained from the sequence of segments on the desired path. This technique outperforms techniques such as segmentation-free Hidden Markov Models using a sliding window. Over-segmentation based on Hidden Markov Models can also be implemented.

Many paths in a segmentation graph can contain segments that are good looking characters. However, the sequence of characters resulting from a given path may not form a valid word (or string) in a dictionary. Very often, the desired path does not appear in the top three paths selected by the dynamic programming algorithm. Consequently, in situations where a lexicon of limited size can be derived, a lexicon-driven matching is more desirable. A lexicon of limited size can be derived in applications such as postal address recognition, where a list of city-state names can be retrieved from a database once the zip code (zip) candidates are known. For each entry in the limited size lexicon, the dynamic programming technique is used to choose which path in the segmentation graph best matches with the entry, and a matching score is then assigned to the entry. The entry with the highest matching score is chosen as the recognition hypothesis.

Given a sequence of N graphemes and a lexicon entry string of length W, the dynamic programming technique can be used for obtaining the best grouping of the N graphemes into W segments. Typically, a dynamic table of size (N*(W+1)) is constructed to obtain the best path. With a technique that takes advantage of the oversegmentation assumption (no undersegmentation), the dynamic table size is reduced to (N−W+1)*(W+1). This technique is described by J. Mao et al. in "A System for Cursive Handwritten Address Recognition," International. Conference. on Pattern Recognition, Brisbane, Australia, Aug. 1998. The reduction is significant when W is large, for example, for city-state-zip matching.

Given a lexicon of L entries, the complexity of the lexicon driven matching is O(L*(N−W+1)*(W+1)). Thus, the speed of a lexicon driven system decreases linearly with the lexicon size. Recognition accuracy also decreases when the lexicon size becomes larger. Consequently, lexicon reduction is very important in a lexicon driven recognition system.

There are several known techniques for lexicon reduction. One commonly used technique is based on holistic word features. Holistic word features are, for example, word length, and the presence of ascenders, descenders, t-crossings, and i-dots. In this approach, holistic word features of the input image are matched against the holistic features of every exemplar of each of the lexicon entries. Lexicon entries which do not match well with the holistic features of the input image are discarded. Due to variations in writing styles, typically more than one exemplar must be stored or synthesized for each lexicon entry. Although lexicon reduction based on holistic word features improves the overall speed of a system by reducing the lexicon size for final recognition, its efficiency is limited by the computational overhead required for extracting holistic word features and feature matching with more than one exemplar for each lexicon entry.

An alternative approach to lexicon reduction is proposed by M. Shridar et al., in "Lexicon Driven Segmentation—Recognition Procedure for Unconstrained Handwritten Words," Proceedings of International Workshop on Frontier in Handwriting Recognition, pp. 122–131, Buffalo, N.Y., 1993. With this approach, the input image is first segmented into segments based on a set of heuristics, and an ASCII string is created based on the recognition results on these segments. A dynamic program is then used to match the ASCII string with each lexicon entry. Lexicon entries with high matching costs are eliminated from further consideration. A shortcoming of this approach is that performance is heavily dependent on the initial segmentation of words into characters, which is problematic for cursive words. Other shortcomings of this approach are that it requires segmenting the words twice, and that it uses unreliable segments when matching with lexicon entries.

Consequently, there is a need for a method for accomplishing lexicon reduction that decreases the time required to recognize a line of cursive text without reducing accuracy.

SUMMARY OF THE INVENTION

Broadly, the present invention concerns a method, apparatus, and article of manufacture employing lexicon reduction using key characters for recognizing a line of cursive text.

In an illustrative embodiment of the invention, the unambiguous parts of a cursive image that can be reliably segmented and recognized, referred to as "key characters", are identified. To identify the key characters, first, a sequence of graphemes are identified in the image. After the graphemes are identified, the graphemes are grouped into segments, with each segment comprising one or more graphemes. In the preferred embodiment more than three graphemes are not used for segments because the over segmenter rarely produces more than three graphemes for a character. For each segment, a level of confidence indicative of whether the segment is a particular character is calculated for a plurality of characters. For each segment, the maximum level of confidence that the segment is any particular character is ascertained. If the maximum level of confidence for the subject segment is greater than a threshold, and is also more than a specified amount greater that the maximum levels of confidence of neighboring segments having at least one grapheme in common with the subject segment, then the character corresponding with the maximum level of confidence for the subject segment is designated as a key character candidate.

In an illustrative embodiment of the invention, key character candidates are then screened using geometric information, in two steps. First, key character candidates that correspond with any characters in a specified group of characters (preferably "l" (the letter "l"), "1" (the number "one"), "r", "o", "t", "f", and "2"), which often correlate with character substitutions or segmentation errors, are eliminated.

In the second step, at least one geometric property of the key character candidates is ascertained. Geometric properties are properties such as the normalized height of the character and the average horizontal number of black to white transitions for the character. Using a density function of the geometric property of the character, the geometrical confidence, which is the probability of not having a better feature value, is calculated. Key character candidates for which the geometrical confidence is less than a required minimum confidence for that geometric property, are eliminated. The remaining key character candidates are then designated as key characters.

An illustrative embodiment of the invention also uses two-stage lexicon reduction employing a combination of length estimation and key characters in the image. The first stage of lexicon reduction uses length estimation to compute a lower bound and an upper bound on the number of characters present in a given image, and then uses these bounds to exclude all lexicon entries which contain too few or too may characters. To implement this first stage of lexicon reduction, for each of a plurality of features in a line of cursive text, a number is ascertained that is indicative of the feature. The features are preferably the number of connected components in the line of cursive text, the number of graphemes in the line of cursive text, the number of horizontal transitions in the line of cursive text, the sum of the number of horizontal transitions in each grapheme in the line of cursive text, and the average height of the graphemes in the line of cursive text. The number indicative of each feature is inputted into a feedforward neural network, which computes the maximum length and minimum length of the line of cursive text. Lexicon entries that have more characters than the computed maximum length, and lexicon entries that have less characters than the computed minimum length, are eliminated.

After the key characters are identified, and preferably after the lexicon has been reduced using the length estimation computed by the neural network, the lexicon is further reduced, using key character strings. In order to produce a key character string, the number of wild characters between neighboring key characters is estimated, preferably by using the same neural network used for calculating the length estimation. A search string comprising the key characters and the wild characters is formed by separating each neighboring pair of key characters by the corresponding estimated number of wild characters. A search position in the lexicon entry for each key character is identified. In the preferred embodiment, this is accomplished by dividing the search string substantially in half, with the key character or wild character at the left end of the left half of the search string aligned with the left most character in the lexicon entry, and with the key character or wild character at the right end of the right half of the search string aligned with the right most character in the lexicon entry. After the halves of the search string are aligned in this manner, search positions in the lexicon entry are identified as the positions in the lexicon entry corresponding with the positions of the key characters in the search string, with each search position corresponding with one key character. A search range is defined for each search position. The search range defines how many characters in the lexicon entry on each side of the search position will be compared to the corresponding key character, in addition to the search position. The search ranges are preferably about plus or minus one to two characters, and are preferably a function of the position of the search position. Each key character is compared to the characters in the lexicon entry in the search range corresponding to the key character. For each of the key characters, it is determined whether there is a mismatch between the key character and all of the characters in the corresponding search range. If the number of mismatches for all of the key characters is greater than (1+(the number of key characters in the search string/ 4)), then the lexicon entry is eliminated.

The invention may be implemented in a variety of embodiments, including as a method, a digital data processing apparatus, an apparatus for identifying cursive text on an object, and as an article of manufacture such as a signal bearing medium tangibly embodying a program of machine-readable instructions executable by a digital data processing apparatus.

Advantageously, the invention accomplishes lexicon reduction in a manner that decreases the time required to recognize a line of cursive text, without reducing accuracy. Another advantage of the invention is that it fits well into cursive handwritten recognition systems based on over segmentation followed by dynamic programming. Another advantage of the present invention is that the overhead for extracting key characters and for length estimation is very small. Another advantage of the invention is that the words are segmented only once, with the segments being used both for the identification of key characters and for length estimation for lexicon reduction. The present invention also provides other advantages and benefits, which are apparent from the following description.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein.

DETAILED DESCRIPTION OF THE PREFERRED EMBODIMENTS

Figure 1A:
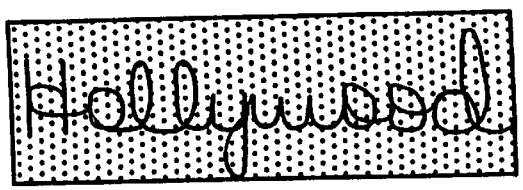
FIG. 1A is an illustration of a cursive word.
Figure 1B:
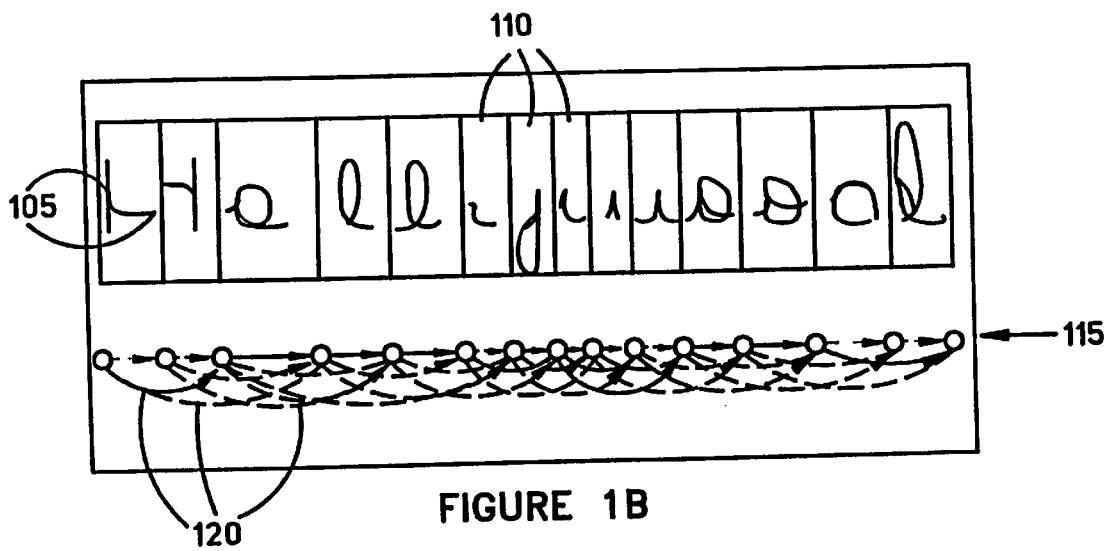
FIG. 1B is an illustration of a cursive word segmented into graphemes, also including a segmentation graph.
Figure 1C:
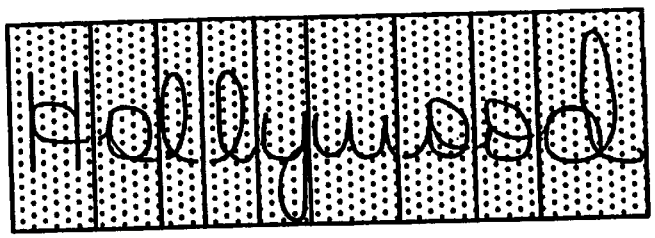
FIG. 1C is an illustration of the sequence of characters obtained from the sequence of segments on the desired path.

The present invention concerns a method, apparatus, and article of manufacture employing lexicon reduction using key characters and a neural network for recognizing a line of cursive text. The line of cursive text can include one or more words, letters, numbers, and/or other symbols, either alone or in combination.

In order to recognize cursive text, an electronic representation of an image, preferably a bit map, is produced. Preferably, the invention is implemented such that the electronic representation of the image is preprocessed to remove graphics, for example a box around an address, or a horizontal line to the left of an address, prior to executing the key character recognition and lexicon reduction discussed herein.

Method
Key Characters

In cursive handwriting, characters are linked by ligatures. Segmentation of a cursive word into characters is an extremely difficult task due to the following facts: (i) The graphemes of many characters can be "good-looking" characters themselves. (ii) Combinations of neighboring graphemes (from the same characters or from different characters) can be "good-looking" characters too. These facts determine that it is not reliable to identify characters in cursive words solely based on recognition of individual segments. On the other hand, observations on a large number of cursive words indicate that there often exist some parts in cursive words that can be reliably segmented and recognized. This observation leads to a formal definition of key characters in a cursive word. Let $G=(GR_1, GR_2, \ldots GR_n)$ be the sequence of graphemes (GRs) in a given image (see FIG. 2) and define $S_{ij}$ to be a segment consisting of a subsection in G: $S_{ij}=(GR_i, GR_{i+1}, \ldots GR_{i+j-1})$; wherein $i \in [1, \ldots n]$, $j \in (1, \ldots, m]$, and $i+j-1 \leq n$, and where m is the maximum number of GRs which are allowed to form a character. Although can be small or larger than three, in the preferred embodiment, m=3.

Let $ch_x(S_{ij}) \in [0, \ldots, 100]$ be the output of a character classifier that computes a confidence for $S_{ij}$ to represent a character x. Let $m(S_{ij})=max_x(ch_x(S_{ij}))$ be the maximum output of the classifier for the segment $S_{ij}$. A key character can be defined as follows:

A segment $S_{ij}$ is a Key Character (KC), if (i) $m(S_{ij}) > T$, for a pre-specified $T \in [0, \ldots, 100]$;
(ii) $m(S_{ij}) > m(S_{kl}) + d$, $\forall S_{kl}: S_{ij} \cap S_{kl} \neq 0$, and $S_{kl} \neq S_{ij}$, for a pre-specified $d \in [0, \ldots, 100]$; and
(iii) if $S_{ij}$ satisfies certain geometric constraints.

The threshold T controls the required minimum confidence for a character to be designated a key character. The value d is selected in proportion to the requirement of how much "better" the KC has to be compared to its environment (the $S_{kl}$). Intuitively speaking, a subject segment is said to be a key character if no other segment that contains at least one grapheme in the subject segment can claim itself as a key character. Thus, this definition of key characters captures the unambiguous parts of a cursive word.

Let $A=A_1, A_2, \ldots A_q$ denote the set of all KCs for a given G. A has the following property: No two KCs in A share one or more GRs, i.e., $A_i \cap A_j=0, i \neq j$. Thus, all of the KCs can be valid simultaneously in a cursive word.

Key characters capture the unambiguous parts of a cursive word. Key characters in a cursive word can be used for coarse recognition of cursive words and for lexicon reduction, and can be followed by any other fine recognition methods. The method of the present invention for extracting key characters in cursive words makes use of both character recognition and geometric information about a character in the text line to filter out unreliable key character candidates.

Key characters in cursive words can also be used for improving the dynamic matching of graphemes with a lexicon entry by weighing more on the key characters. This adaptive weighting approach can be extended to lexicon-free recognition to increase the probability that the "best path" in the segmentation graph corresponds to the desired (or true) path.

Given the above definition of key characters, a method for extracting key characters in a cursive word is now described. The method has two steps. In the first step, a set of key character candidates (KCCs) which satisfy conditions (i)–(ii) in the definition are extracted. Then, these KCCs are screened based on their geometric measurements in the text line.

Figure 2:
FIG. 2 is an illustration of a line of cursive text segmented into graphemes.
Figure 3:
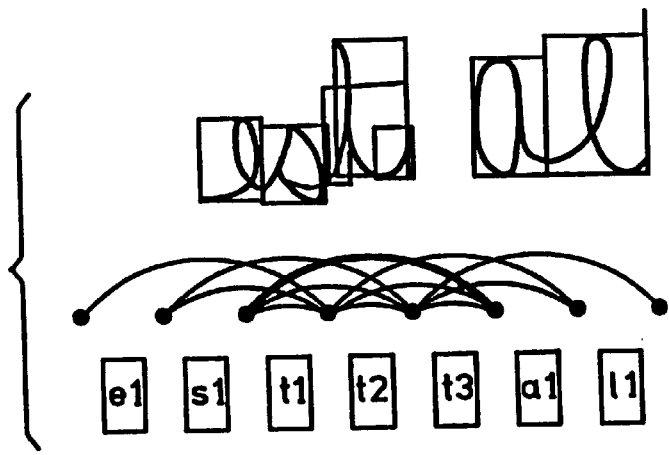
FIG. 3 is an illustration of the selection of a key character candidate.

FIG. 3 shows the selection of the character 't' as a KCC. This KCC is represented by segment $S_{6,3}$ shown in FIG. 2. The bold arc encompassing the boxes labeled t1, t2, and t3 in the lower portion of FIG. 3 represents the segment $S_{6,3}$. The other arcs represent all of the other $S_{ij}$ which share one or more GRs with $S_{6,3}$.

TABLE 1

| | Key Character Candidates | | | | | | | | | |
|---|---|---|---|---|---|---|---|---|---|---|
| index | 1 | 6 | 9 | 13 | 17 | 18 | 19 | 20 | 21 | 22 |
| length | 3 | 3 | 1 | 2 | 1 | 1 | 1 | 1 | 1 | |
| 1st | W(92) | T(99) | A(95) | 4(84) | I(88) | 5(100) | 3(100) | 2(100) | 1(99) | 9(100) |
| 2nd | | | | Y(11) | 5(45) | S(79) | S(96) | D(51) | L(83) | G(91) |
| 3rd | | | | | 1(13) | G(21) | | A(8) | I(13) | |

Figure 4:
FIG. 4 is an illustration of the line of cursive text of FIG. 2 with the key character candidates in boxes.

FIG. 4 shows all extracted KCCs for the sequence of GRs in FIG. 2. Table 1 lists the top three interpretations x with their assigned confidences for each KCC for T=70, d=10. Although these values for T and d are preferred, any other values can also be used. Different values of T and/or d can be used to change the number of KCCs produced. Although not required, only characters x with $ch_x(S_{ij}) \geq 5$ are listed in Table 1.

In Table 1, the first row indicates the index of the first GR in each KCC, and the second row indicates the number of GRs for each KCC. In this example all the top choices of the character classifier represent the correct interpretations. The observation of hundreds of KCCs has shown that the correct interpretation of the KCC can most often be found in the top two choices.

In order to achieve a high confidence that the KCCs are correctly segmented from their background and are correctly recognized, a two step verification process is applied to the KCCs. The goal of the verification process is to select a subset of the KCCs that will form a reliable set of KCs.

In the preferred embodiment, the first step of the verification process removes all KCCs in the top three interpretations which correspond with any character, in a specified group of characters, which correlate often with character substitutions or segmentation errors. In alternative embodiments this can be applied to more or less than the top three interpretations. Preferably, the specified group of characters is "l"(the letter "l"), "1" (the number "one"), "r", "o", "t", "f", and "2". These characters have been found to correlate most often with substitution errors. Alternatively, other groups of characters can be used.

Geometrical Properties of KCCs

The second verification step is more complex. In this step character class specific geometrical properties of a KCC, such as the normalized vertical position and the normalized height of a KCC, are considered.

Figure 8:
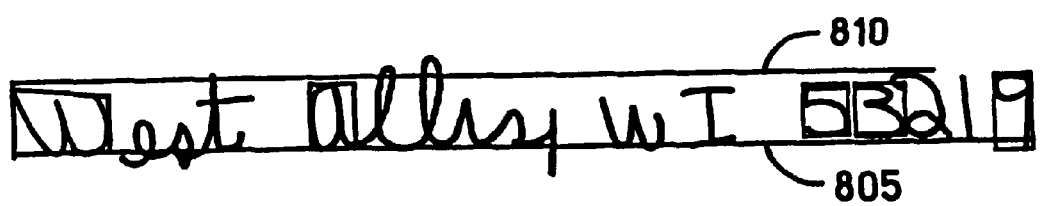
FIG. 8 is an illustration of the line of cursive text of FIG. 2 with the key characters in boxes.

In order to determine the normalized vertical position or the normalized height of a KCC, it is necessary to estimate a base line and an ascender line (also referred to as a top line). FIG. 8 shows an estimated base line 805 and an estimated ascender line 810. The estimation of the base line is preferably accomplished with simple line fitting using the least squares method for the bottom left corners of the bounding boxes of the extracted GRs. Bounding boxes can be seen around each of the GRs in FIG. 2. After a first estimate of the base line is calculated, the coordinates of the corner that is most distant from the line are removed from the set of corner coordinates, and then a new estimate of the base line is calculated. This process is repeated several times in order to produce the final estimate of the base line.

The coordinates of the top left corners of the GRs are used similarly to calculate an estimate of the ascender line, with the exception that some of the coordinates of the top left corners are modified in order to fit a centerline that is substantially parallel to the baseline. To accomplish this, before line fitting is applied, the heights of upper case letters having heights that are less than the average of the mean and the maximum height of all upper case GRs are set equal to the average of the mean and the maximum height of all upper case GRs.

Figure 5:
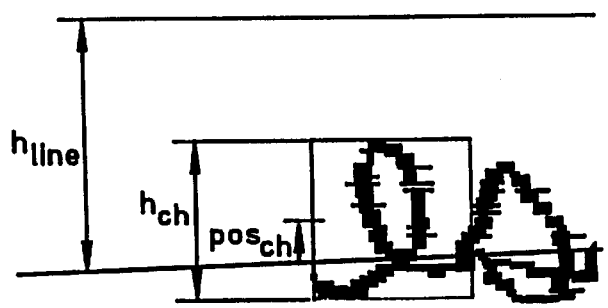
FIG. 5 is an illustration showing the height and position of a character.

Any of a number of geometrical properties can be used for the geometrical verification. Preferably, the properties that are used for geometrical verification are different properties than the properties used for character recognition. For example, the average number of horizontal transitions of a KCC, the normalized height, and the normalized vertical position are preferably the geometrical properties that are used for the geometrical verification. The number of horizontal transitions is the number of locations where a black pixel on a scan line is followed by a white pixel. The normalized position $pos_{norm}$ is defined as the distance from the estimated base line to the middle of the bounding box of the character (designated $pos_{ch}$), divided by the distance between the base line and the ascender line $h_{line}$ measured at the position of the KCC. Referring to FIG. 5, the normalized height $h_{norm}$ is defined as the height of the bounding box of the character $h_{ch}$ divided by $h_{line}$.

Figure 6A:
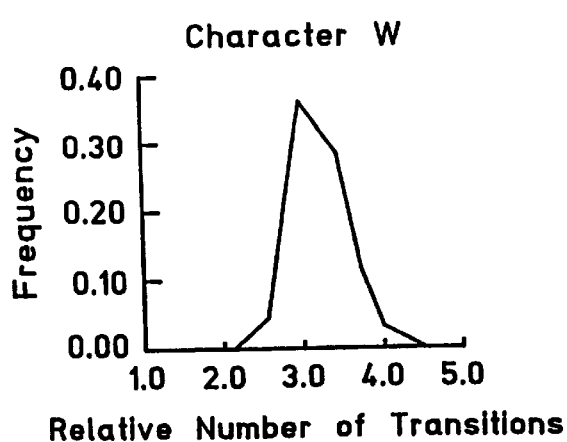
FIG. 6A is a histogram of the mean number of transitions for the character class "W".
Figure 6B:
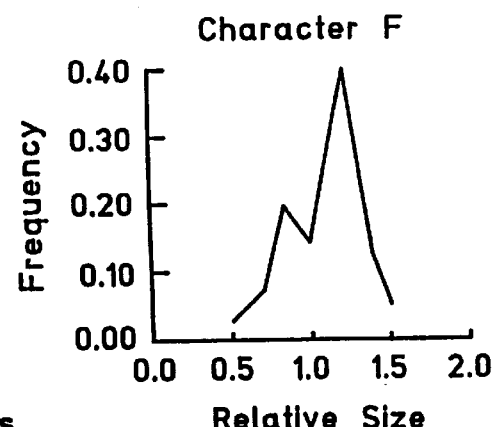
FIG. 6B is a histogram of the normalized height for the character class "F".

Using training data that provides the truth value (which in this case is the character identity) associated with each GR, the distribution of the geometric properties can be estimated for each character class. Each letter, number, and symbol is a separate character class. FIGS. 6A and 6B are histograms for character specific distributions of two different geometrical properties. FIG. 6A is a histogram for the mean number of transitions for the character class "W". FIG. 6B is a histogram for the normalized height for the character class "F".

The transition histogram indicates that in most cases the normalized number of horizontal transitions is close to three, according to the sampled writing styles provided by the training data. Since the presently preferred implementation treats capital and small letters as the same character class, the histogram for the letter "F" shows two peaks: one for capital "F" (normalized height of 0.8) and one for small "f" (normalized height of 1.2).

A geometrical confidence is an indicator of how "good" a certain observed value for a given geometric property is. A geometrical confidence is defined as the probability for not having a better value. Given the density function $d_{ix}$ of a geometric property i of a character class x, the geometrical confidence $conf_{ix}(v)$ for a given feature value v is defined as follows:

$$conf_{ix}(v) = \int d_{ix}(u) I(d_{ix}(u) \leq d_{ix}(v)) du$$

Figure 7:
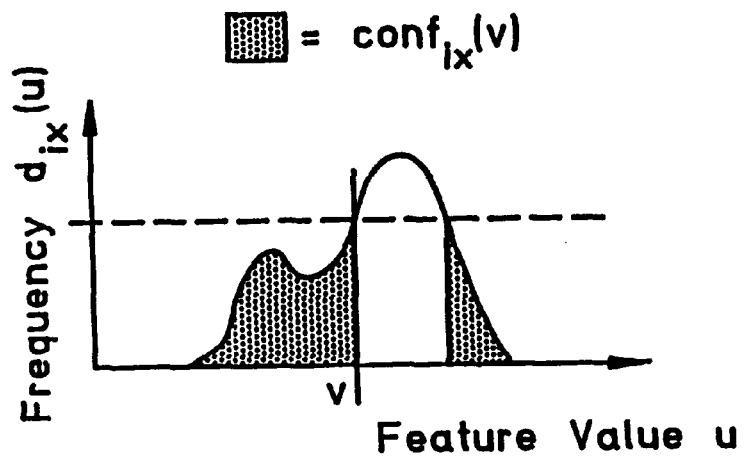
FIG. 7 is a graph illustrating the geometrical confidence $conf_{ix}(v)$ using an illustrative density function $d_{ix}$.

(with the integral evaluated from minus infinity to plus infinity)
where I() is an indicator function. According to this definition, a value $conf_{ix}(v) \in [0,1]$ is produced. Generally, "good" feature values v lead to a high $d_{ix}(v)$. FIG. 7 illustrates the concept of geometrical confidences.

Preferably, the geometrical confidences are computed for each property i for each KCC. In order to be accepted as a KC, a KCC has to achieve the following minimum confidences: preferably, 0.5 for the mean number of transitions, and 0.2 for both the normalized vertical position and the normalized height. Other values for the minimum confidences can be used in order to change the number of KCCs that will pass the geometric screening. Other appropriate minimum confidences can be ascertained for other geometrical properties, and any of these values can be changed as desired.

FIG. 8 shows the KCs remaining after the verification process was conducted on the extracted KCCs shown in FIG. 4. The character "t" and the digits "2" and "1" were removed in the first verification step. The geometric verification excluded the letter "s" (combined with the comma) and the letter "I".

Description of Tasks of Method for Identifying Key Characters

Figure 9A:
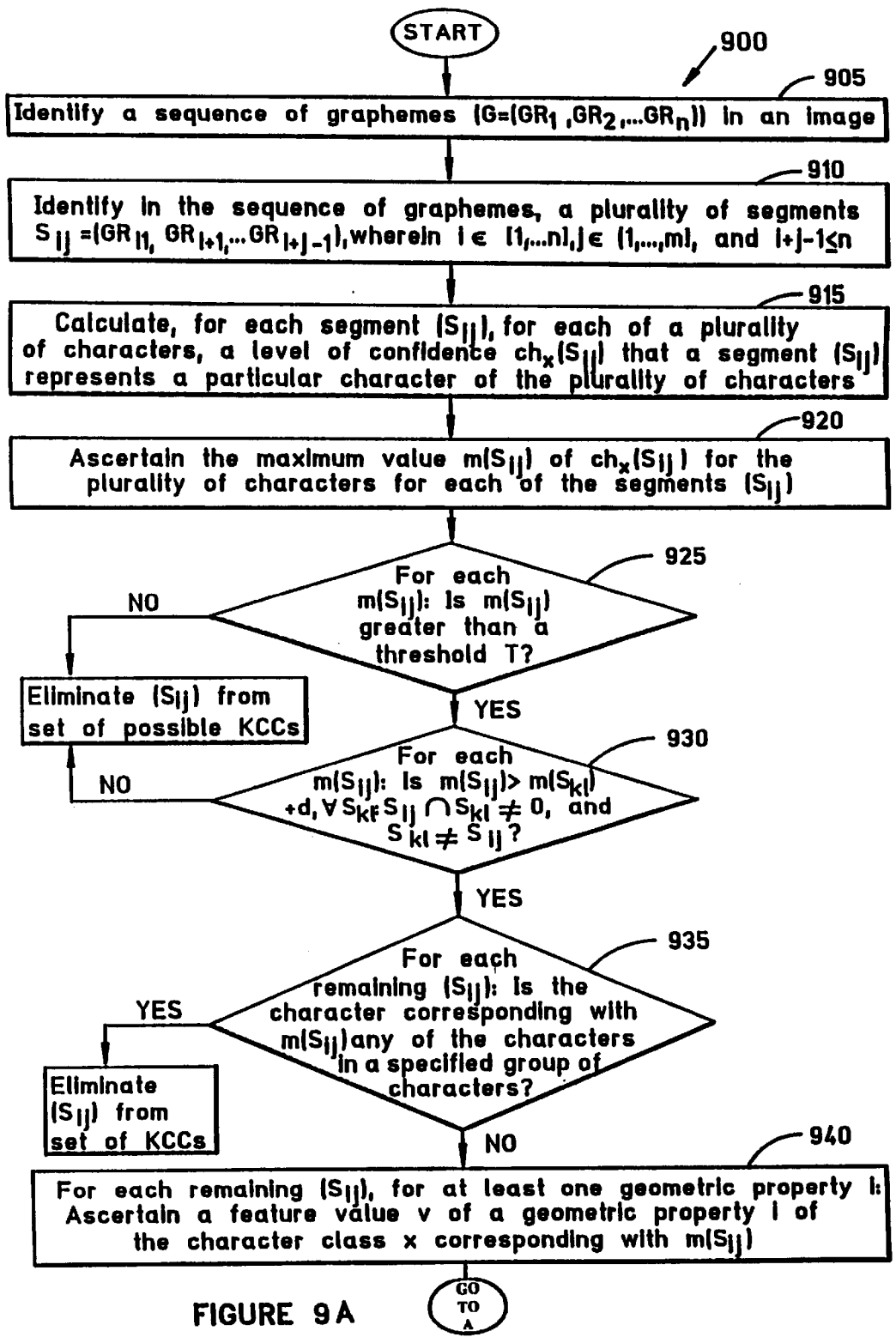
FIG. 9A is a flow chart of an illustrative embodiment of a method for identifying key characters in cursive text in accordance with the invention.
Figure 9B:
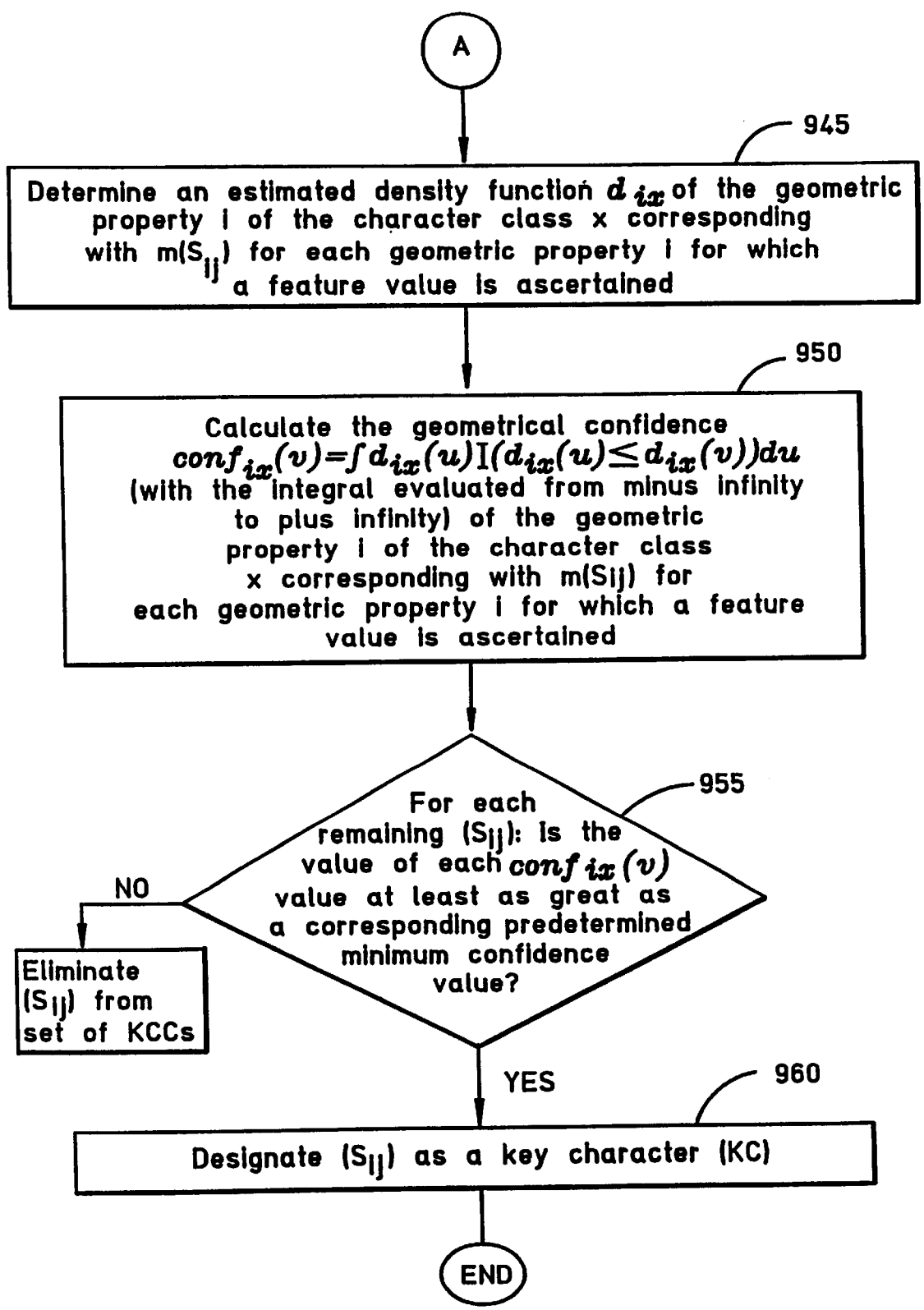
FIG. 9B is a continuation of the flow chart of FIG. 9A.

An illustrative embodiment of a method for identifying key characters in cursive text is illustrated by the tasks 900 of the flowchart in FIGS. 9A and 9B. In task 905, a sequence of graphemes ($G=(GR_1, GR_2, \ldots GR_n)$) is identified in an image. In task 910, a plurality of segments $S_{ij}=(GR_i, GR_{i+1}, \ldots GR_{i+j-1})$ is identified in the sequence of graphemes, wherein $i \in [1, \ldots n]$, $j \in (1, \ldots, m]$, and $i+j-1<n$. In task 915, for each of a plurality of characters, and for at least one segment ($S_{ij}$) and preferably for each of the segments ($S_{ij}$), a level of confidence $ch_x(S_{ij})$ that a segment ($S_{ij}$) represents a particular character of the plurality of characters is calculated. In task 920, the maximum value $m(S_{ij})$ of $ch_x(S_{ij})$ for the plurality of characters for at least one of the segments (preferably each of the segments) ($S_{ij}$) is ascertained. In task 925, it is determined if $m(S_{ij})$ is greater than a threshold T for each segment ($S_{ij}$) for which $m(S_{ij})$ is ascertained. In task 930, it is determined if $m(S_{ij})>m(S_{kl})+d$, $\forall S_{kl}$: $S_{ij} \cap S_{kl} \neq 0$, and $S_{kl} \neq S_{ij}$, for each segment ($S_{ij}$) for which $m(S_{ij})$ is ascertained. In task 935, it is determined whether the character corresponding with $m(S_{ij})$ for at least one segment ($S_{ij}$) for which $m(S_{ij})$ is ascertained (preferably for each remaining-noneliminated ($S_{ij}$)) is any character in a specified group of characters. In task 940, a feature value v is ascertained. A feature value v is ascertained of a geometric property i of the character class x corresponding with $m(S_{ij})$ for at least one segment ($S_{ij}$) for which $m(S_{ij})$ is ascertained (preferably for each remaining-noneliminated ($S_{ij}$). In task 945, an estimated density function $d_{ix}$ is determined. The estimated density function $d_{ix}$ is determined of the geometric property i of the character class x corresponding with $m(S_{ij})$ for each segment ($S_{ij}$) for which the feature value v is ascertained. Although not required, preferably $d_{ix}$ for all character classes x and all geometric properties i is determined prior to performing the other tasks in the method for identifying key characters. Once determined, an estimated density function $d_{ix}$ can be used repeatedly for screening key character candidates. In task 950, the geometrical confidence of the geometric property i of the character class x corresponding with $m(S_{ij})$ for each segment ($S_{ij}$) for which the feature value v is ascertained, is calculated. The geometrical confidence is defined as:

$$conf_{ix}(v) = \int d_{ix}(u) I(d_{ix}(u) \leq d_{ix}(v)) du$$

(with the integral evaluated from minus infinity to plus infinity)

In task 955, each value of $conf_{ix}(v)$ is compared to a predetermined minimum confidence value. If each value of $conf_{ix}(v)$ for a segment ($S_{ij}$) is not at least as great as the required minimum confidence value, the segment ($S_{ij}$) is eliminated from the set of KCCs.

Segments ($S_{ij}$) for which it is determined that $m(S_{ij})$ is greater than a threshold T, and that $m(S_{ij})>m(S_{kl})+d$, $\forall S_{kl}$: $S_{ij} \cap S_{kl} \neq 0$, and $S_{kl} \neq S_{ij}$, and that are determined not to be any of the characters in the specified group of characters, and that are determined to have a value of $conf_{ix}(v)$ for each geometrical property used for the geometrical verification that is at least as great as the required minimum confidence for that geometrical property, are designated as key characters (KC). Thus, in task 960, ($S_{ij}$) is designated as a KC.

Lexicon Reduction

Preferably, the invention is implemented to include lexicon reduction. Preferably, the lexicon reduction includes two stages. In the first stage of lexicon reduction, the maximum number of characters and the minimum number of characters present in a given image is estimated, preferably with a neural network. Then, all lexicon entries that contain more characters than the maximum or less characters than the minimum are eliminated. In the second stage of lexicon reduction, a search key character string is extracted from the image using key characters and length estimation between every two neighboring key characters. The search string is then used to exclude all lexicon entries which do not match the search string well enough. Because examining a lexicon entry in the first stage is faster than in the second stage, preferably the lexicon is reduced using key character strings after the lexicon has been reduced using the length estimation computed by the neural network. However, either method of lexicon reduction can be used without the other, and either method can be executed before the other. Also, identifying key characters can be performed without also performing lexicon reduction, although preferably both identifying key characters and lexicon reduction are performed. Preferably, key character identification is performed and both methods of lexicon reduction are also performed. These methods of lexicon reduction are now described in more detail.

Lexicon Reduction Using a Neural Network

Length estimation is performed in order to provide an estimate of how many characters are present in a given image without performing expensive recognition. To calculate a length estimate for a given image of text line, several features are first extracted from the line. Although any number of features can be extracted, preferably five features are extracted. Although the length can be estimated with other methods, preferably the features are inputted into a neural network, which is used to estimate the line length in terms of the number of characters. Since such an estimation will not be accurate without character recognition, a range for the length is also provided by the network.

Because the image is segmented into connected components (CCs) and graphemes (GRs) in order to ascertain the key characters, the number of CCs and GRs can be directly used as the first two features without any additional computation. Additional information for the length estimation can be extracted by measuring the number of horizontal transitions in the image. The number of horizontal transitions is given by the number of locations where a black pixel on a scan line is followed by a white pixel. The third feature is the average number of horizontal transitions per scan line, trans(image). The number of scan lines is a function of the resolution of the scanner. Only scan lines that intersect at least one of the graphemes at least once are used in this calculation. The fourth feature is similar to the third. However, instead of measuring the average number of horizontal transitions trans(image), it uses the sum of trans ($GR_i$) over all GRs. The fifth feature is the average height of the GRs (normalized by the maximum height found in the provided GRs).

Table 2 shows the extracted feature values for the city-state-zip (CSZ) line shown in FIG. 2. The mean ($\mu$) and standard deviation ($\sigma$) of each feature, which were estimated from a training set, are also shown in Table 2. Each of the five features is normalized to have a zero-mean and unit variance. The normalized features are inputted into a feed-forward neural network, that preferably has five input units, ten hidden units, and three output units. The three output units produce estimates of the best length ($len_{best}$), maximum length ($len_{max}$), and minimum length ($len_{min}$), respectively. Three outputs are used because they provide a dynamic range rather than a static range for the length estimate, which is desirable because the length estimation is imperfect, and changes from image to image.

TABLE 2

Features for Length Estimation

| Feature | v | μ | σ | Remarks |
|---|---|---|---|---|
| f1 | 12 | 5.64 | 4.50 | number of CCs |
| f2 | 22 | 8.31 | 7.09 | number of GRs |
| f3 | 16.23 | 5.91 | 3.83 | normalized transitions |
| f4 | 31.11 | 11.25 | 9.60 | sum of normalized transitions per GR |
| f5 | 0.66 | 0.72 | 0.17 | average normalized height of GRs |

The neural network was trained on a set of truthed data of 5000 lines, and partial lines (between neighboring key characters). Each line or partial line was associated with the true number of characters. An independent data set of 3200 lines was used for testing. Standard back propagation learning was used for training the $len_{best}$ output neuron. After a few epochs (less than ten), stable recognition rates of 57% on the validation set were achieved.

Preferably, the difference $len_{true}-len_{best}$ is used in the back propagation step for training the $len_{best}$ output unit. Preferably, the two output units corresponding with the minimum $len_{min}$ and the maximum $len_{max}$ are trained slightly differently than the $len_{best}$ output unit. Instead of using the difference delta=$len_{true}-len_{best}$ in the back propagation step, the difference is scaled up or down depending on whether the length is under-estimated or over-estimated estimated by the $len_{best}$ unit. In the preferred embodiment, the new delta' for the $len_{min}$ unit is computed as follows:

delta'=a delta, for delta<0, and delta'=b delta, for delta≧0, where a=about 8 and b=about 0.25. By exchanging the values for a and b, the same formula is used for training the $len_{max}$ unit. A network trained using this scheme produces an average range of length of 5.98 and a coverage of 99% (which is the percentage that the true length was found within the range).

Once the estimation for a minimum and a maximum number of characters is ascertained, lexicon entries which have either less characters than the estimated minimum or more characters than the estimated maximum, are eliminated. For the city-state-zip line in FIG. 2, the estimated range for the true length is from 11 to 18 characters.

Description of Tasks of Method for Lexicon Reduction Using Length Estimates

Figure 10A:
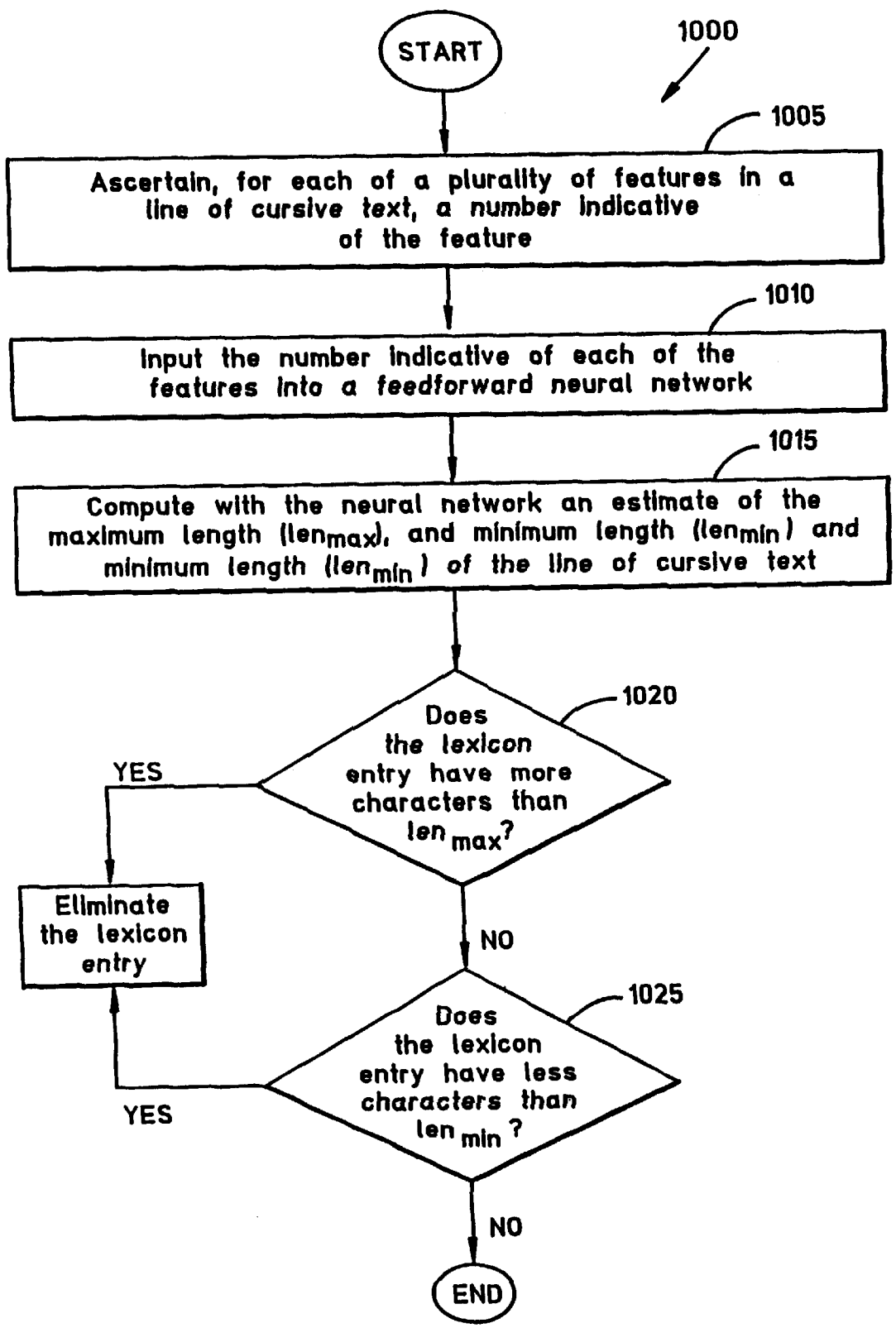
FIG. 10A is a flow chart of an illustrative embodiment of a method for lexicon reduction using length estimates, in accordance with the invention.

An illustrative embodiment of a method for lexicon reduction using length estimates is illustrated by the tasks 1000 of the flowchart in FIG. 10A. In task 1005, for each of a plurality of features in a line of cursive text, a number indicative of the feature is ascertained. In task the number indicative of each of the features is inputted into a feedforward neural network. In task 1015, an estimate of the maximum length ($len_{max}$), and minimum length ($len_{min}$) of the line of cursive text is computed with the neural network. In task 1020, the number of characters in the lexicon entry is compared to $len_{max}$, and the lexicon entry is eliminated if it has more characters than $len_{max}$. Similarly, in task 1025, the number of characters in the lexicon entry is compared to $len_{min}$, and the lexicon entry is eliminated if it has less characters than $len_{max}$.

Although not required, as mentioned above, preferably the plurality of features comprises: (a) the number of connected components in the line of cursive text; (b) the number of graphemes in the line of cursive text; (c) the number of horizontal transitions in the line of cursive text; (d) the sum of the number of horizontal transitions in each grapheme in the line of cursive text; and, (e) the average height of the graphemes in the line of cursive text.

Figure 10B:
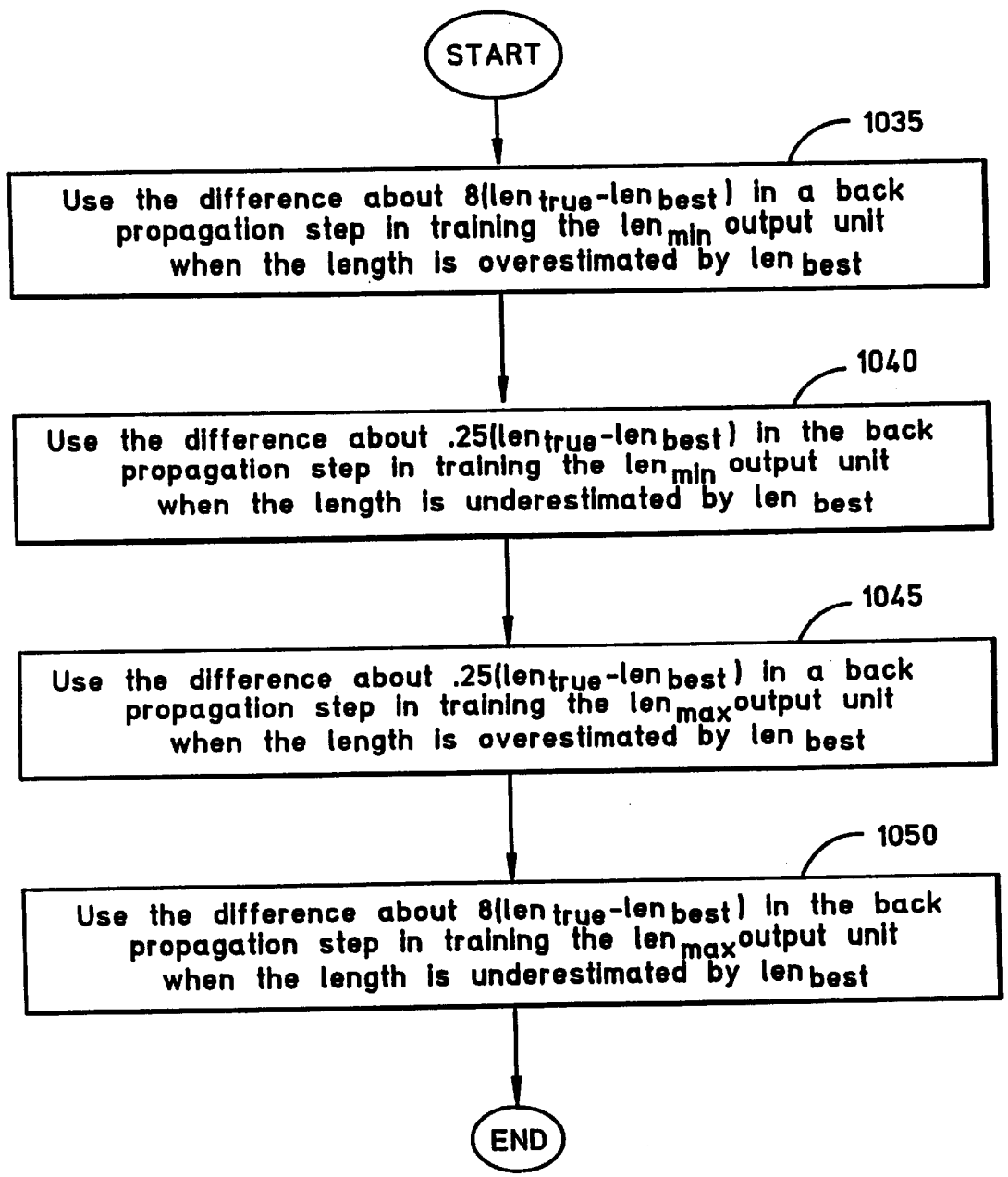
FIG. 10B is a flow chart of an illustrative embodiment of a method for training the $len_{max}$ and $len_{min}$ outputs of a neural network in a method for lexicon reduction using length estimates, in accordance with the invention.

Preferably, the neural network has a $len_{best}$ output unit, a $len_{max}$ output unit, and a $len_{min}$ output unit, and, although not required, the method for lexicon reduction using length estimates preferably also includes the following tasks 1035 to 1050, illustrated in FIG. 10B. In task 1035, the difference of about 8($len_{true}-len_{best}$) is used in a back propagation step in training the $len_{min}$ output unit when the length is overestimated by $len_{best}$. In task 1040, the difference of about 0.25($len_{true}-len_{best}$) is used in the back propagation step in training the $len_{min}$ output unit when the length is underestimated by $len_{best}$. In task 1045, the difference of about 0.25($len_{true}-len_{best}$) is used in a back propagation step in training the $len_{max}$ output unit when the length is overestimated by $len_{best}$. In task 1050, the difference of about 8($len_{true}-len_{best}$) is used in the back propagation step in training the $len_{max}$ output unit when the length is underestimated by $len_{best}$.

Lexicon Reduction Using Key Character Strings

After the key characters are identified, preferably the lexicon is reduced using key character strings. Once the key characters are extracted, a search string can be generated by combining length estimation and KCs. The set of all possible search strings can be defined by the following regular expression; (A*-*)+ where A represents the set of the selected number of top choices made by the character classifier and '-' represents a wild character. The number of wild characters between two subsequent KCs is estimated preferably using the same neural network used for the length estimation for city-state-zip (CSZ) and street (STR) lines. Applied to the GRs in FIG. 2 this procedure leads to the search string {W}--{A}------{5,S)-3,S}--{9,G}. If only the top choice for each KC of the character classifier is represented, the search string can be written as W--A------53--9.

Table 3 demonstrates the process of matching a search string and a lexicon entry. A search position in the lexicon entry for each key character is identified. In the preferred embodiment, this is accomplished by dividing the search string substantially in half, with the key character or wild character at the left end of the left half of the search string aligned with the left most character in the lexicon entry, and with the key character or wild character at the right end of the right half of the search string aligned with the right most character in the lexicon entry. Alternatively, the search string is not divided in half, and one end of the search string is aligned with a corresponding end of the lexicon entry. After the search string is aligned, search positions in the lexicon entry are identified as the positions in the lexicon corresponding with the positions of the key characters in the search string, with each search position corresponding with one key character. Also, a search range is defined for each search position. The search range defines how many characters in the lexicon entry on each side of the search position will be compared to the corresponding key character, in addition to the search position. In the preferred embodiment, the minimum search range is set to ±1 at the left end and at the right end of the lexicon entry, and grows, preferably linearly (rounded to integer values), towards the middle of the lexicon entry up to a maximum search range which is: ((the length of the lexicon entry/8)+1) character positions. (The length of the lexicon entry is the number of characters in the lexicon entry.) Even though the search range may still be referred to as ±1, if a key character is at the left end of the search string, the search range for this key character is actually only +1, due to the left end of the lexicon entry, and similarly, if a key character is at the right end of the search string, the search range for this key character is actually only −1, due to the right end of the lexicon entry. Alternatively, other search ranges can be used.

TABLE 3

Matching Key Characters

| lexicon entry | +EST+LLISWI53219 |
| search range | ........[x].. |
| search string | W - - A - - - - - - 53 - - 9 |
| | ..........SS. .G |

For each of the key characters, it is determined whether there is a mismatch between the key character and all of the characters in the corresponding search range. Because the number of wild characters, the position of the KCs in the search string, and the correct interpretation do not necessarily correlate with the true position and character identity, a flexible matching allowing a certain amount of mismatches between key characters in search strings and lexicon entries is applied. If a search string contains n KCs, the maximum number of allowed mismatches is preferably set to 1+n/4. If the number of mismatches is greater than 1+n/4, then the lexicon entry is eliminated. One consequence of this approach is that no lexicon reduction is performed if the generated search string contains less than two KCs. Alternatively, other formulas allowing a different number of mismatches could be used.

In Table 3 the current search position is marked by the letter 'x' and the search range is indicated by square brackets. It can be seen that the first two KCs have been successfully matched (They are marked with plus signs to prevent a single character of the lexicon entry from being used more than once). At the current search position the character "5" of the lexicon entry will be marked with a plus sign because the system first tries to find a match for the top choice of the KC.

The number of mismatches is computed by subtracting the number of plus signs from the number of KCs in the search string. This difference is compared to the maximum number of mismatches allowed for the current search string.

Figure 11:
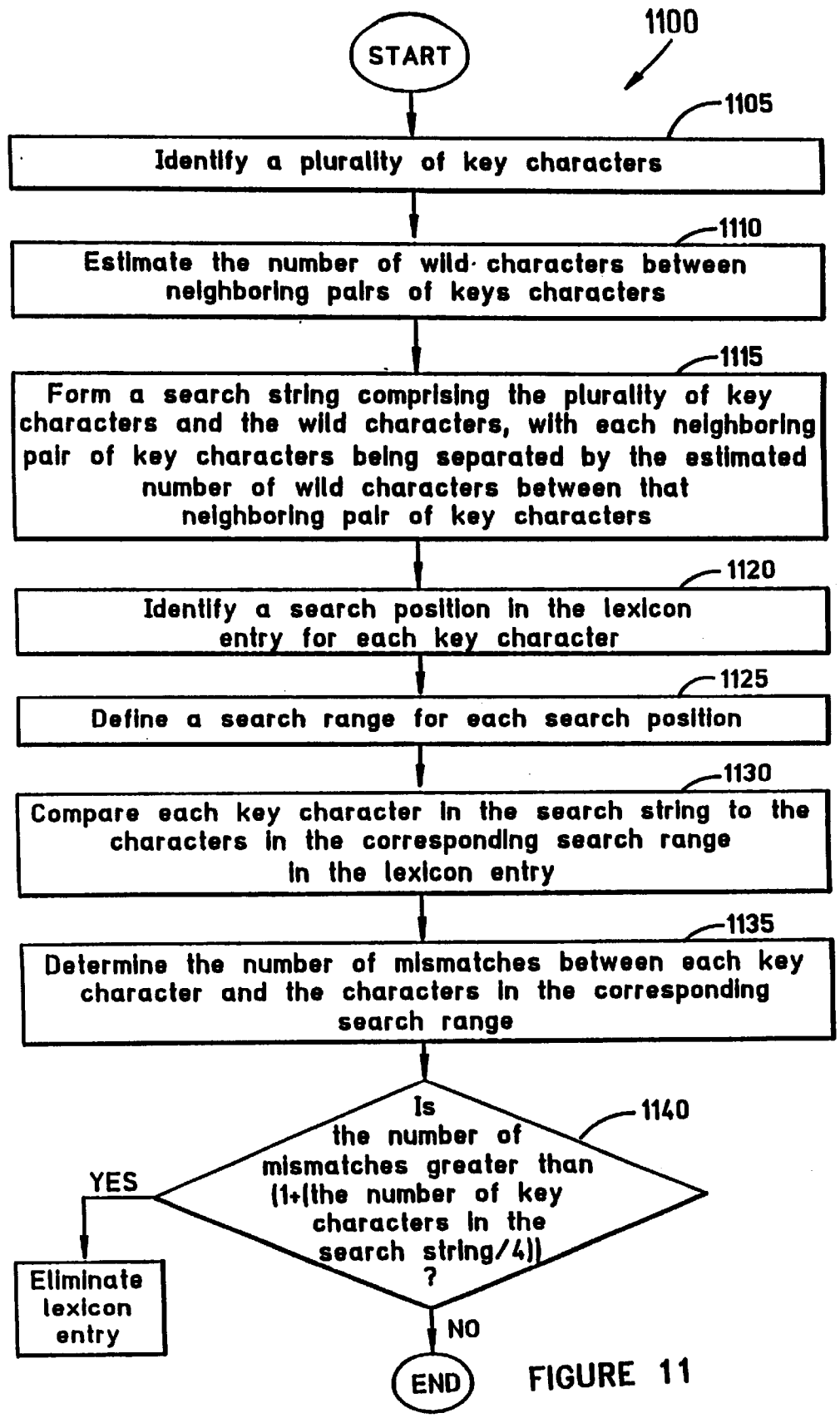
FIG. 11 is a flow chart of an illustrative embodiment of a method for lexicon reduction using key character strings, in accordance with the invention.

Description of Tasks of Method for Lexicon Reduction Using Key Character Strings An illustrative embodiment of a method for lexicon reduction is illustrated by the tasks 1100 of the flowchart in FIG. 11. In task 1105, a plurality of key characters are identified. In task 1110, the number of wild characters between neighboring pairs of key characters is estimated. In task 1115, a search string is formed, with the search string comprising the plurality of key characters and the wild characters, with each neighboring pair of key characters being separated by the estimated number of wild characters between that neighboring pair of key characters. In task 1120, a search position in the lexicon entry for each key character is identified. In task 1125, a search range for each search position is defined. In task 1130, each key character in the search string is compared to the characters in the corresponding search range in the lexicon entry. In task 1135, the number of times there is a mismatch between a key character and all of the characters in the corresponding search range is determined. For example, there is one mismatch for each key character that does not match with any of the characters in the corresponding search range of the lexicon entry. In task 1140, the lexicon entry is eliminated if the number of mismatches is greater than (1+(the number of key characters in the search string/4)).

Article of Manufacture

As an example of an embodiment of the methods of the present invention, one or more of the methods of the invention may be implemented by operating a digital processing apparatus to execute a sequence of machine readable instructions. In an illustrative embodiment of the invention, the machine readable instructions may comprise lines of "C" and assembly language code. These instructions may reside in various types of data storage media. In this respect the present invention concerns an article of manufacture, comprising a data storage medium tangibly embodying a program of machine readable instructions executable by a digital data processor to perform one or more of the methods of the present invention.

Figure 12A:
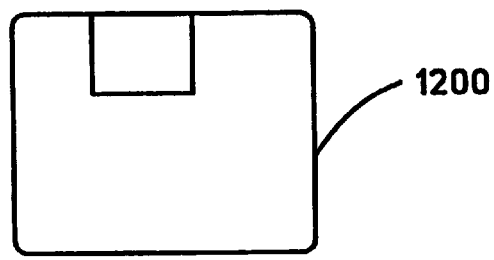
FIG. 12A is an article of manufacture embodied by a first illustrative embodiment of a data storage medium in accordance with the invention.
Figure 12B:
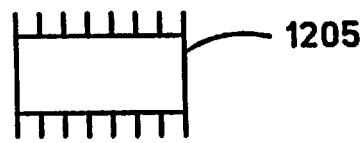
FIG. 12B is an article of manufacture embodied by a second illustrative embodiment of a data storage medium in accordance with the invention.

The data storage medium may be, for example, a magnetic data storage diskette 1200, illustrated in FIG. 12A, or a random access memory (RAM) 12B. Alternatively, instead of, or in addition to the magnetic data storage diskette and/or the RAM, the data storage medium may be a conventional "hard drive", a RAID array, electronically erasable RAM, read only memory (ROM), an optical storage device (for example, a WORM), magnetic tape, paper "punch" cards, and/or other data storage media, or any combination of these media. Preferably, the data storage medium is RAM.

In an alternative embodiment, the invention could be implemented partially or exclusively in hardware.

Digital Data Processing Apparatus

Figure 13:
FIG. 13 is a block diagram of an illustrative embodiment of a digital data processing apparatus in accordance with the invention.

An alternative embodiment of the invention is a digital data processing apparatus 1300, illustrated in FIG. 13, programmed to perform one or more of the methods described herein. The digital processing apparatus can be a microprocessor, a microcontroller, a personal computer, a mainframe computer, or any other type of digital data processing apparatus. Preferably, the digital data processing apparatus is a microprocessor in a personal computer.

Apparatus for Identifying Cursive Text on an Object

Figure 14:
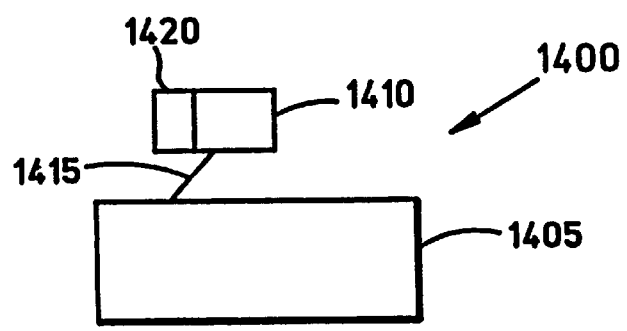
FIG. 14 is a block diagram of an illustrative embodiment of an apparatus for identifying cursive text on an object in accordance with the invention.

Another alternative embodiment of the invention is an apparatus 1400 for identifying cursive text on an object, illustrated in FIG. 14. The apparatus includes a digital data processing apparatus 1405, and also includes an optical scanner 1410. The optical scanner detects the cursive text on the object and produces an electronic representation of the cursive text. The scanner is communicatively coupled to the digital data processing apparatus with connector 1415, which can be wire, fiber optic cable, or a radio link. The object can be an envelope, check, business form, box, package, or any other object on which there is cursive text. The scanner can be a flat bed scanner, a hand held scanner, a digital camera, and/or any other device for producing an electronic representation of an image. For postal applications, in order to accommodate envelopes of different thicknesses, preferably the scanner is a digital camera. A flat bed scanner is preferably used for business forms. Preferably, the apparatus also includes an automatic object feeder 1420, to advance objects on which there is cursive text, past the optical scanner. The automatic object feeder can be a document feeder, a conveyor, or any other device for moving objects.

Conclusion

Illustrative embodiments of the invention, including what are presently considered to be the preferred embodiments of the invention, have been described herein. However, it will be apparent to those skilled in the art that various changes and modifications can be made without departing from the scope of the invention as defined by the appended claims. While illustrative embodiments of the invention have been discussed herein, it is not intended that the invention should be limited to only the embodiments discussed herein. Rather, the invention should be limited only by the scope of the claims.

What is claimed is:

1. In a method for identifying key characters in cursive text, performing tasks comprising:

identifying a sequence of graphemes $(G=(GR_1, GR_2, \ldots GR_n))$ in an image;

identifying in the sequence of graphemes, a plurality of segments $S_{ij}=(GR_{i[1]}, GR_{i+1}, \ldots GR_{i+j-1})$, wherein $i \in \{1, \ldots, n\}$, $j \in \{1, \ldots, m\}$, and $i+j-1 \leq n$;

calculating, for each of a plurality of characters, a level of confidence $ch_x(S_{ij})$ that at least one of the segments $(S_{ij})$ represents a particular character of the plurality of characters;

ascertaining the maximum value $m(S_{ij})$ of $ch_x(S_{ij})$ for the plurality of characters for at least one of the segments $(S_{ij})$;

determining if $m(S_{ij})$ is greater than a threshold T for each segment $(S_{ij})$ for which $m(S_{ij})$ is ascertained; and determining if $m(S_{ij})>m(S_{kl})+d$, $\forall S_{kl}$: $S_{ij} \cap S_{kl} \neq 0$, and $S_{kl} \neq S_{ij}$, for each segment $(S_{ij})$ for which $m(S_{ij})$ is ascertained, wherein $S_{kl}$ comprises an environmental measure of said segment $S_{ij}$ and $d \in \{1, \ldots, 100\}$.

2. The method of claim 1 further comprising determining if the character corresponding with $m(S_{ij})$ for at least one segment $(S_{ij})$ for which $m(S_{ij})$ is ascertained is any character in a specified group of characters.

3. The method of claim 2 wherein the specified group of characters is "l", "1", "r", "o", "t", "f", and "2".

4. The method of claim 1 further comprising:

ascertaining a feature value v of a geometric property i of the character class x corresponding with $m(S_{ij})$ for at least one segment $(S_{ij})$ for which $m(S_{ij})$ is ascertained;

determining an estimated density function $d_{ix}$ of the geometric property i of the character class x corresponding with $m(S_{ij})$ for each segment $(S_{ij})$ for which the feature value v is ascertained;

calculating the geometrical confidence $$conf_{ix}(v) = \int d_{ix}(u) I(d_{ix}(u) \leq d_{ix}(v)) du$$

(with the integral evaluated from minus infinity to plus infinity)

of the geometric property i of the character class x corresponding with $m(S_{ij})$ for each segment $(S_{ij})$ for which the feature value v is ascertained, wherein I( ) comprises an indicator function and u comprises a feature value; and comparing each $conf_{ix}(v)$ value to a predetermined minimum confidence value.

5. A method for identifying key characters in cursive text, comprising:

identifying a sequence of graphemes $(G=(GR_1, GR_2, \ldots GR_n))$ in an image;

identifying in the sequence of graphemes, a plurality of segments $S_{ij}=(GR_{i[1]}, GR_{i+1}, \ldots GR_{i+j-1},$ wherein $i \in \{1, \ldots, n\}$, $j \in \{1, \ldots, m\}$, and $i+j-1 \leq n$;

calculating, for each of a plurality of characters, a level of confidence $ch_x(S_{ij})$ that at least one of the segments $(S_{ij})$ represents a particular character of the plurality of characters;

ascertaining the maximum value $m(S_{ij})$ of $ch_x(S_{ij})$ for the plurality of characters for at least one of the segments $(S_{ij})$;

determining if $m(S_{ij})$ is greater than a threshold T for each segment $(S_{ij})$ for which $m(S_{ij})$ is ascertained; and determining if $m(S_{ij})>m(S_{kl})+d$, $\forall S_{kl}$: $S_{ij} \cap S_{kl} \neq 0$, and $S_{kl} \neq S_{ij}$, for each segment $(S_{ij})$ for which $m(S_{ij})$ is ascertained, wherein $S_{kl}$ comprises an environmental measure of said segment $S_{ij}$ and $d \in \{1, \ldots, 100\}$;

ascertaining a feature value v of a geometric property i of the character class x corresponding with $m(S_{ij})$ for at least one segment $(S_{ij})$ for which $m(S_{ij})$ is ascertained;

determining an estimated density function $d_{ix}$ of the geometric property i of the character class x corresponding with $m(S_{ij})$ for each segment $(S_{ij})$ for which the feature value v is ascertained;

calculating the geometrical confidence $$conf_{ix}(v) = \int d_{ix}(u) I(d_{ix}(u) \leq d_{ix}(v)) du$$

(with the integral evaluated from minus infinity to plus infinity)

of the geometric property i of the character class x corresponding with $m(S_{ij})$ for each segment $(S_{ij})$ for which the feature value v is ascertained, wherein I( ) comprises an indicator function and u comprises a feature value; and comparing each $conf_{ix}(v)$ value to a predetermined minimum confidence value.

6. The method of claim 5 wherein the specified group of characters is "l", "1", "r", "o", "t", "f", and "2".

7. An article of manufacture comprising a data storage medium tangibly embodying a program of machine-readable instructions executable by a digital processing apparatus to perform, in a method for identifying key characters in cursive text, tasks comprising:

identifying a sequence of graphemes $(G=(GR_1, GR_2, \ldots GR_n))$ in an image;

identifying in the sequence of graphemes, a plurality of segments $S_{ij}=(GR_{i[1]}, GR_{i+1}, \ldots GR_{i+j-1},$ wherein $i \in \{1, \ldots, n\}$, $j \in \{1, \ldots, m\}$, and $i+j-1 \leq n$;

calculating, for each of a plurality of characters, a level of confidence $ch_x(S_{ij})$ that at least one of the segments $(S_{ij})$ represents a particular character of the plurality of characters;

ascertaining the maximum value $m(S_{ij})$ of $ch_x(S_{ij})$ for the plurality of characters for at least one of the segments $(S_{ij})$;

determining if $m(S_{ij})$ is greater than a threshold T for each segment $(S_{ij})$ for which $m(S_{ij})$ is ascertained; and determining if $m(S_{ij})>m(S_{kl})+d$, $\forall S_{kl}$: $S_{ij} \cap S_{kl} \neq 0$, and $S_{kl} \neq S_{ij}$, for each segment $(S_{ij})$ for which $m(S_{ij})$ is ascertained, wherein $S_{kl}$ comprises an environmental measure of said segment $S_{ij}$ and $d \in \{1, \ldots, 100\}$.

8. The article of manufacture of claim 7, the tasks further comprising determining if the character corresponding with $m(S_{ij})$ for at least one segment $(S_{ij})$ for which $m(S_{ij})$ is ascertained is any character in a specified group of characters.

9. The article of manufacture of claim 8 wherein the specified group of characters is "l", "1", "r", "o", "t", "f", and "2".

10. The article of manufacture in claim 7, the tasks further comprising:

ascertaining a feature value v of a geometric property i of the character class x corresponding with $m(S_{ij})$ for at least one segment $(S_{ij})$ for which $m(S_{ij})$ is ascertained;

determining an estimated density function $d_{ix}$ of the geometric property i of the character class x corresponding with $m(S_{ij})$ for each segment $(S_{ij})$ for which the feature value v is ascertained;

calculating the geometrical confidence $$conf_{ix}(v) = \int d_{ix}(u) I(d_{ix}(u) \leq d_{ix}(v)) du$$

(with the integral evaluated from minus infinity to plus infinity)

of the geometric property i of the character class x corresponding with $m(S_{ij})$ for each segment $(S_{ij})$ for which the feature value v is ascertained wherein I( ) comprises an indicator function and u comprises a feature value; and comparing each $conf_{ix}(v)$ value to a predetermined minimum confidence value.

11. An article of manufacture comprising a data storage medium tangibly embodying a program of machine-readable instructions executable by a digital processing apparatus to perform, in a method for identifying key characters in cursive text, tasks comprising:

identifying a sequence of graphemes ($G=(GR_1, GR_2, \ldots GR_n)$) in an image;

identifying in the sequence of graphemes, a plurality of segments $S_{ij}=(GR_{i[l]}, GR_{i+1}, \ldots GR_{i+j-1}$, wherein $i \in \{1, \ldots, n\}$, $j \in \{1, \ldots, m\}$, and $i+j-1 \leq n$;

calculating, for each of a plurality of characters, a level of confidence $ch_x(S_{ij})$ that at least one of the segments ($S_{ij}$) represents a particular character of the plurality of characters;

ascertaining the maximum value $m(S_{ij})$ of $ch_x(S_{ij})$ for the plurality of characters for at least one of the segments ($S_{ij}$);

determining if $m(S_{ij})$ is greater than a threshold T for each segment ($S_{ij}$) for which $m(S_{ij})$ is ascertained; and determining if $m(S_{ij}) > m(S_{kl}) + d$, $\forall S_{kl}: S_{ij} \cap S_{kl} \neq 0$, and $S_{kl} \neq S_{ij}$, for each segment ($S_{ij}$) for which $m(S_{ij})$ is ascertained, wherein $S_{kl}$ comprises an environmental measure of said segment $S_{ij}$ and $d \in \{1, \ldots, 100\}$;

ascertaining a feature value v of a geometric property i of the character class x corresponding with $m(S_{ij})$ for at least one segment ($S_{ij}$) for which $m(S_{ij})$ is ascertained;

determining an estimated density function $d_{ix}$ of the geometric property i of the character class x corresponding with $m(S_{ij})$ for each segment ($S_{ij}$) for which the feature value v is ascertained;

calculating the geometrical confidence $$conf_{ix}(v) = \int d_{ix}(u) I(d_{ix}(u) \leq d_{ix}(v)) du$$

(with the integral evaluated from minus infinity to plus infinity)

of the geometric property i of the character class x corresponding with $m(S_{ij})$ for each segment ($S_{ij}$) for which the feature value v is ascertained, wherein I( ) comprises an indicator function and u comprises a feature value; and comparing each $conf$, (v) value to a predetermined minimum confidence value.

12. The article of manufacture of claim 11, wherein the specified group of characters is "l", "1", "r", "o", "t", "f", and "2".

13. A digital data processing apparatus, program to perform, in a method for identifying key characters in cursive text, tasks comprising:

identifying a sequence of graphemes ($G=(GR_1, GR_2, \ldots GR_n)$) in an image;

identifying in the sequence of graphemes, a plurality of segments $S_{ij}=(GR_{i[l]}, GR_{i+1}, \ldots GR_{i+j-1}$, wherein $i \in \{1, \ldots, n\}$, $j \in \{1, \ldots, m\}$, and $i+j-1 \leq n$;

calculating, for each of a plurality of characters, a level of confidence $ch_x(S_{ij})$ that at least one of the segments ($S_{ij}$) represents a particular character of the plurality of characters;

ascertaining the maximum value $m(S_{ij})$ of $ch_x(S_{ij})$ for the plurality of characters for at least one of the segments ($S_{ij}$);

determining if $m(S_{ij})$ is greater than a threshold T for each segment ($S_{ij}$) for which $m(S_{ij})$ is ascertained; and determining if $m(S_{ij}) > m(S_{kl}) + d$, $\forall S_{kl}: S_{ij} \cap S_{kl} \neq 0$, and $S_{kl} \neq S_{ij}$, for each segment ($S_{ij}$) for which $m(S_{ij})$ is ascertained, wherein $S_{kl}$ comprises an environmental measure of said segment $S_{ij}$ and $d \in \{1, \ldots, 100\}$.

14. The apparatus of claim 13, the tasks further comprising determining if the character corresponding with $m(S_{ij})$ for at least one segment ($S_{ij}$) for which $m(S_{ij})$ is ascertained is any character in a specified group of characters.

15. The apparatus of claim 14 wherein the specified group of characters is "l", "1", "r", "o", "t", "f", and "2".

16. The apparatus of claim 13, the tasks further comprising:

ascertaining a feature value v of a geometric property i of the character class x corresponding with $m(S_{ij})$ for at least one segment ($S_{ij}$) for which $m(S_{ij})$ is ascertained;

determining an estimated density function $d_{ix}$ of the geometric property i of the character class x corresponding with $m(S_{ij})$ for each segment ($S_{ij}$) for which the feature value v is ascertained;

calculating the geometrical confidence $$conf_{ix}(v) = \int d_{ix}(u) I(d_{ix}(u) \leq d_{ix}(v)) du$$

(with the integral evaluated from minus infinity to plus infinity)

of the geometric property i of the character class x corresponding with $m(S_{ij})$ for each segment ($S_{ij}$) for which the feature value v is ascertained, wherein I( ) comprises an indicator function and u comprises a feature value; and comparing each $conf_{ix}(v)$ value to a predetermined minimum confidence value.

17. A digital data processing apparatus programed to perform a method for identifying key characters in cursive text, the method comprising:

identifying a sequence of graphemes ($G=(GR_1, GR_2, \ldots GR_n)$) in an image;

identifying in the sequence of graphemes, a plurality of segments $S_{ij}=(GR_{i[l]}, GR_{i+1}, \ldots GR_{i+j-1}$, wherein $i \in \{1, \ldots, n\}$, $j \in \{1, \ldots, m\}$, and $i+j-1 \leq n$;

calculating, for each of a plurality of characters, a level of confidence $ch_x(S_{ij})$ that at least one of the segments ($S_{ij}$) represents a particular character of the plurality of characters;

ascertaining the maximum value $m(S_{ij})$ of $ch_x(S_{ij})$ for the plurality of characters for at least one of the segments ($S_{ij}$);

determining if $m(S_{ij})$ is greater than a threshold T for each segment ($S_{ij}$) for which $m(S_{ij})$ is ascertained; and determining if $m(S_{ij}) > m(S_{kl}) + d$, $\forall S_{kl}: S_{ij} \cap S_{kl} \neq 0$, and $S_{kl} \neq S_{ij}$, for each segment ($S_{ij}$) for which $m(S_{ij})$ is ascertained wherein $S_{kl}$ comprises an environmental measure of said segment $S_{ij}$ and $d \in \{1, \ldots, 100\}$;

ascertaining a feature value v of a geometric property i of the character class x corresponding with $m(S_{ij})$ for at least one segment ($S_{ij}$) for which $m(S_{ij})$ is ascertained;

determining an estimated density function $d_{ix}$ of the geometric property i of the character class x corresponding with $m(S_{ij})$ for each segment ($S_{ij}$) for which the feature value v is ascertained;

calculating the geometrical confidence $$conf_{ix}(v) = \int d_{ix}(u) I(d_{ix}(u) \leq d_{ix}(v)) du$$

(with the integral evaluated from minus infinity to plus infinity)

of the geometric property i of the character class x corresponding with $m(S_{ij})$ for each segment $(S_{ij})$ for which the feature value v is ascertained wherein I( ) comprises an indicator function and u comprises a feature value; and comparing each $conf_{ix}(v)$ value to a predetermined minimum confidence value.

18. The apparatus of claim 17 wherein the specified group of characters is "l", "1", "r", "o", "t", "f", and "2".

19. An apparatus for identifying cursive text on an object, comprising:

an optical scanner;

a digital data processing apparatus communicatively coupled to means for detecting the cursive text on the object, the digital data processing apparatus being programmed to perform a method for identifying key characters in cursive text, the method comprising:

identifying a sequence of graphemes $(G=(GR_1, GR_2, \ldots GR_n))$ in an image;

identifying in the sequence of graphemes, a plurality of segments $S_{ij}=(GR_{i[I]}, GR_{i+1}, \ldots GR_{i+j-1}$, wherein is $i \in \{1, \ldots, n\}$, $j \in \{1, \ldots, m\}$, and $i+j-1 \leq n$;

calculating, for each of a plurality of characters, a level of confidence $ch_x(S_{ij})$ that at least one of the segments $(S_{ij})$ represents a particular character of the plurality of characters;

ascertaining the maximum value $m(S_{ij})$ of $ch_x(S_{ij})$ for the plurality of characters for at least one of the segments $(S_{ij})$;

determining if $m(S_{ij})$ is greater than a threshold T for each segment $(S_{ij})$ for which $m(S_{ij})$ is ascertained; and determining if $m(S_{ij}) > m(S_{kl}) + d$, $\forall S_{kl}$: $S_{ij} \cap S_{kl} \neq 0$, and $S_{kl} \neq S_{ij}$, for each segment $(S_{ij})$ for which $m(S_{ij})$ is ascertained, wherein $S_{kl}$ comprises an environmental measure of said segment $S_{ij}$ and $d \in \{1, \ldots, 100\}$;

ascertaining a feature value v of a geometric property i of the character class x corresponding with $m(S_{ij})$ for at least one segment $(S_{ij})$ for which $m(S_{ij})$ is ascertained;

determining an estimated density function $d_{ix}$ of the geometric property i of the character class x corresponding with $m(S_{ij})$ for each segment $(S_{ij})$ for which the feature value v is ascertained;

calculating the geometrical confidence $$conf_{ix}(v) = \int d_{ix}(u) I(d_{ix}(u) \leq d_{ix}(v)) du$$

(with the integral evaluated from minus infinity to plus infinity)

of the geometric property i of the character class x corresponding with $m(S_{ij})$ for each segment $(S_{ij})$ for which the feature value v is ascertained, wherein I( ) comprises an indicator function and u comprises a feature value; and comparing each $conf_{ix}(v)$ value to a predetermined minimum confidence value.

20. The apparatus of claim 19 wherein the specified group of characters is "l", "1", "r", "o", "t", "f", and "2".

21. The apparatus of claim 19, further comprising an automatic object feeder positioned to advance objects past the optical scanner.

* * * * *